US007782578B2

(12) United States Patent
Tao

(10) Patent No.: US 7,782,578 B2
(45) Date of Patent: Aug. 24, 2010

(54) RELAY PROTECTION CIRCUIT AND CONTROLLING METHOD THEREOF HAVING RELATIVELY BETTER EFFECTIVENESS FOR SUPPRESSING DC ARC

(75) Inventor: Chi-Ming Tao, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 585 days.

(21) Appl. No.: 11/682,115

(22) Filed: Mar. 5, 2007

(65) Prior Publication Data

US 2007/0217092 A1 Sep. 20, 2007

(30) Foreign Application Priority Data

Mar. 17, 2006 (TW) ................................ 95109363

(51) Int. Cl.
*H02H 3/00* (2006.01)
*H01H 9/30* (2006.01)
*H01H 9/00* (2006.01)

(52) U.S. Cl. ............................ 361/13; 361/2; 361/160

(58) Field of Classification Search .................... 361/1, 361/13, 160, 2
See application file for complete search history.

(56) References Cited

U.S. PATENT DOCUMENTS

| | | | | |
|---|---|---|---|---|
| 5,479,075 | A * | 12/1995 | Chen | 315/283 |
| 5,536,980 | A * | 7/1996 | Kawate et al. | 307/116 |
| 5,652,688 | A * | 7/1997 | Lee | 361/13 |
| 2004/0052011 | A1* | 3/2004 | King et al. | 361/2 |

* cited by examiner

*Primary Examiner*—Robert DeBeradinis
*Assistant Examiner*—Scott Bauer
(74) *Attorney, Agent, or Firm*—Volpe and Koenig PC

(57) ABSTRACT

The provided relay system includes a load having a first terminal and a second terminal, a relay coupled to a common ground and the first terminal of the load and a relay protection circuit eliminating an arc generated by the relay. The relay protection circuit has an energy storage element with a first terminal coupled to the first terminal of the load and a second terminal and electrically connected to the relay in parallel for storing and releasing an electrical power, and a high-impedance element coupled to the second terminal of the load to cause the energy storage element to have a relatively speedy charge and a relatively slow discharge.

20 Claims, 6 Drawing Sheets

1st charging loop
1st discharging loop
2nd charging loop

RELAY PROTECTION CIRCUIT AND CONTROLLING METHOD THEREOF HAVING RELATIVELY BETTER EFFECTIVENESS FOR SUPPRESSING DC ARC

FIELD OF THE INVENTION

The present invention relates to a relay protection circuit and its controlling method eliminating an arc generated by a relay system. More particularly, the present invention relates to a relay system including a relay protection circuit and its controlling method having a relatively better effectiveness in eliminating a DC arc.

BACKGROUND OF THE INVENTION

Relay is a necessary element in the general application of electronic devices. But, frequently either the voltage withstanding capability of relay is insufficient, or the current flowing through the relay is relatively large, which generates an arc, and results in a situation being selected from a group consisting of the life-span of the relay is shortened in the minor case, the contacts of the relay are melted down in the major case, and even a fire could be broken out to cause an industrial safety problem in the worst case. In a different situation, the voltage across the contacts of the relay is raised such that the tolerated current flowing through the relay is dramatically decreased and results in being one of the states that the space of the product is occupied but the expected requirements are not achieved in the minor case and a relatively more complex circuit is in need since the relay is not applicable in the major case. Thus, the development of a relay system including a relay protection circuit having a relatively better effectiveness in suppressing the arc is a necessity.

In general, the protection circuits suppressing an arc for a relay in the prior art are added over the trip point of the relay, e.g., the protection circuit having a resistor, the protection circuit having an RC circuit (including a resistor and a capacitor) and the protection circuit having a diode etc., which could not achieve an effective trip of the trip point under one of a relatively large voltage and a relatively large current, and there are other problems such as the relay could not be effectively and fully employed as specified by the specification.

Base on the above mentioned considerations, a relay protection circuit including only two simple components, a high-impedance element and an energy storage element, which make the relay operate within the relatively maximum range of the specification and the problems caused by the arc could also be solved to avoid the increase of the costs and the industrial accidents.

Generally speaking, relatively the most annoying problem is how to eliminate the arc, and the most difficult one of which is to eliminate the arc generated by a DC power supply when a relay is used in a power system (such as an isolated switch at the output terminal of a power supply). Especially when the voltage across the two terminals of a contact is larger than the rated voltage of relay, frequently either the voltage across the two terminals of the contact is lowered, or the elements, which could stand for relatively higher voltages, are in need so as to prevent one of the industrial accidents and the electricity breakdown of the power supply at the customer side. The general approach for eliminating the arc generated by the DC power supply includes the employments of the various protection circuits in the prior art, which are described as follows.

As shown in FIG. 1, it is a circuit diagram of a conventional relay system 1 including a relay protection circuit 11 having an RC circuit. The protection circuit having a RC circuit 11 includes a resistor R1 and a capacitor C1 electrically connected to the resistor R1 in series, and the RC circuit 11 is electrically connected to the trip point of the relay X1 in parallel. In which, the resistance of R1 needs to be carefully notice to avoid consequences that the arcs are not totally eliminated when the relay is turned on and off continuously, which results in the melting down of the contacts, and the relay protection circuit 11 will totally lose its functions when the voltage across the two terminals of certain contact of the relay X1 is larger than the specification of the relay X1.

In FIG. 2, it is a circuit diagram of a conventional relay system 2 including a relay protection circuit 21. The relay protection circuit 21 includes a capacitor C1 electrically connected to the trip point of the relay X1 in parallel. The capacitor C1 is charged to its saturation voltage V1 rather quickly if there is a relatively larger arc existed and results in the consequences that the arc is not totally eliminated and the contacts of the relay X1 are melted down.

Please refer to FIG. 3, which is a circuit diagram of a conventional relay system 3 including a relay protection circuit 31. The relay protection circuit 31 includes two relays (X1 and X2) being electrically connected to each other in series to eliminate the arc. Referring to FIG. 4, it shows a circuit diagram of a conventional relay system 4 including a relay protection circuit 41. The relay protection circuit 41 includes a double pole single throw relay X1. Each of the relay protection circuits 31 and 41 can be used to eliminate the arcs generated by the relay systems 3 and 4 respectively. However, the relay protection circuit 31 including two relays (X1 and X2) could result in the problems such as the volume of the product is relatively larger and the manufacturing costs are relatively higher though the arc generated by the relay system 3 could be eliminated. The drawback of using the relay protection circuit 41 as shown in FIG. 4 to eliminate the arc generated by the relay system 4 is that it can not be employed in a circuit having a relatively larger current due to the limitations of the double pole single throw relays thereof.

Keeping the drawbacks of the prior arts in mind, and employing experiments and research full-heartily and persistently, the applicant finally conceived the relay protection circuit and the controlling method thereof having the relatively better effectiveness for suppressing the DC arc.

SUMMARY OF THE INVENTION

It is therefore an object of the present invention to propose a relay protection circuit and a controlling method thereof having a relatively better effectiveness for suppressing a DC arc, which can be applied to one of a big relay having a relatively higher operational voltage and an isolated switch at the output terminal of a power supply that the unwanted results such as the contacts of the relay are melted down due to the voltage across the two terminals of a contact is larger than the rated voltage of relay and the working voltage is lowered so as to employ the relay could all be avoided.

According to the first aspect of the present invention, the relay system includes a load having a first and a second terminals, a first relay coupled to a common ground and the first terminal of the load and a relay protection circuit suppressing an arc generated by the first relay includes an energy storage element coupled to the first relay and the first terminal of the load for storing and releasing an electrical power and a high-impedance element coupled to the second terminal of the load to cause the energy storage element to have a relatively speedy charge and a relatively slow discharge.

Preferably, the energy storage element has a first terminal coupled to the first terminal of the load and a second terminal, the high-impedance element has a first terminal coupled to the second terminal of the load and a second terminal coupled to the second terminal of the energy storage element, and the first relay further includes a trip point having a normally open, a normally closed and a common contacts, forming a turn-on status of the first relay via connecting the normally open and the common contacts to form a first loop, forming a turn-off status of the first relay via connecting the normally closed and the common contacts to form a second loop, electrically connected to the energy storage element in parallel via the normally open and the normally closed contacts and coupled to the common ground via the common contact, and a control coil controlling a trip of the trip point to form one of the first loop and the second loop.

Preferably, the relay system further includes a relay control circuit controlling the turn-on and the turn-off statuses of the first relay and including a first diode having an anode and a cathode, electrically connected to the control coil in parallel and being a bleeder diode for de-energizing the control coil, a first resistor having a first terminal coupled to the cathode of the first diode and a second terminal coupled to the second terminal of the high-impedance element and a switch having a first terminal coupled to the anode of the first diode and a second terminal coupled to the common ground, a voltage divider electrically connected between the energy storage element and the high-impedance element in series, providing an output signal when the first relay is tripping and including a second resistor having a first terminal coupled to the second terminal of the high-impedance element and a second terminal, a third resistor having a first terminal coupled to the first terminal of the second resistor and a second terminal coupled to the second terminal of the second resistor and a zener diode having an anode coupled to the second terminal of the energy storage element and a cathode coupled to the second terminal of the third resistor and an alarming system having a first and a second terminals, being one of the configurations that the first terminal is coupled to the second terminal of the energy storage element and the second terminal is coupled to the voltage divider, and the first terminal is coupled to the voltage divider and the second terminal is coupled to the second terminal of the energy storage element, and generating an alarm signal when the first relay is tripping, further including an alarming connector having a first and a second terminals and generating the alarming signal when the output signal is at zero current and a second relay having a control coil coupled to the first and the second terminals of the alarm system and electrically connected to the zener diode in parallel, a normally open contact, a normally closed contact and a common contact coupled to the second terminal of the alarming connector and being one of the configurations that the normally open contact is an open circuit and the normally closed contact is coupled to the first terminal of the alarming connector, and the normally closed contact is an open circuit and the normally open contact is coupled to the first terminal of the alarming connector, in which each of the first and the second relays is a changeover relay, and the high-impedance element is one of a second diode and a fourth resistor, and the fourth resistor has a relatively high resistance.

Preferably, the energy storage element is a capacitor.

Preferably, the relay system further includes a DC power supply providing a voltage, in which the DC power supply includes a positive terminal coupled to the second terminal of the load and a negative terminal coupled to the common ground.

According to the second aspect of the present invention, the relay protection circuit adapted to be connected to a first relay and a load having a first and a second terminals for eliminating an arc generated by the first relay includes a first electronic element coupled to the first relay and the first terminal of the load for storing and releasing an electrical power and a second electronic element coupled to the second terminal of the load to cause the first electronic element to have a relatively speedy charge and a relatively slow discharge.

Preferably, the first electronic element is an energy storage element.

Preferably, the second electronic element is a high-impedance element.

Preferably, the relay protection circuit further includes a first relay and a load to form a relay system.

According to the third aspect of the present invention, the controlling method for a relay system, in which the relay system includes a load at a startup status, a relay protection circuit having an energy storage element coupled to the load and a high-impedance element coupled to the energy storage element and a first relay coupled to the energy storage element, includes the steps of: (a) charging the energy storage element to a saturation voltage when the first relay is at a turn-off status; (b) discharging the energy storage element when the first relay is tripping from the turn-off status to a turn-on status and eliminating an arc of the first relay by a reverse voltage thereon once the first relay is at the turn-on status; (c) charging the energy storage element while the first relay remains at the turn-on status; and (d) going to step (a) when the first relay is at the turn-off status.

Preferably, the reverse voltage is formed by inputting a voltage across the energy storage element to the relay.

Preferably, the relay system further includes a DC power supply having a positive terminal coupled to the load and a negative terminal coupled to a common ground, and the step (a) further includes the step of: (a1) forming a charging loop by the positive terminal of the power supply, the load, the energy storage element and the first relay and the negative terminal of the power supply when the energy storage element is charged.

Preferably, the step (b) further includes the steps of: (b1) discharging the energy storage element via a discharging loop formed by the energy storage element, the load and the high-impedance element; (b2) reversing a voltage polarity of the energy storage element instantaneously to cause the first relay to have the reverse voltage once the first relay is at the turn-on status; and (b3) forming a main large current loop by the positive terminal of the DC power supply, the load, the first relay and the negative terminal of the DC power supply such that the main large current loop is conductive while the first relay normally remains at the turn-on status.

Preferably, the step (c) further includes the steps of: (c1) forming a charging loop by the positive terminal of the power supply, the high-impedance element, the energy storage element, the first relay and the negative terminal of the power supply when the energy storage element is charged; and (c2) causing the main large current loop to be conductive simultaneously while the first relay normally remains at the turn-on status.

Preferably, the step (d) further includes the step of: (d0) forming a discharging loop and causing the first relay to have the reverse voltage so as to eliminate the arc when the first relay is tripping from the turn-on status to the turn-off status.

Preferably, the step (d0) further includes the steps of: (d01) causing the first relay to have the reverse voltage when the voltage across the energy storage element is reversed while the first relay is tripping from the turn-on status to the turn-off status; and (d02) causing the main large current loop to be conductive simultaneously while the first relay is tripping from the turn-on status to the turn-off status.

Preferably, the discharge loop includes the energy storage element and the first relay.

According to the fourth aspect of the present invention, the controlling method for a relay system, in which the relay system includes a load at a startup status, a relay protection circuit having an energy storage element coupled to the load and a high-impedance element coupled to the energy storage element and a first relay coupled to the energy storage element, includes the steps of: (a) charging the energy storage element to a saturation voltage when the first relay is at a turn-off status; (b) charging the energy storage element while the first relay remains at the turn-on status; (c) forming a discharging loop and causing the first relay to have the reverse voltage to eliminate an arc of the first relay when the first relay is tripping from the turn-on status to the turn-off status; and (d) going to step (a) when the first relay is at the turn-off status.

Preferably, the relay system further includes a voltage divider electrically connected between the energy storage element and the high-impedance element in series, and each of the charging and the discharging loops further includes the voltage divider.

Preferably, the step (a) further includes the step of: (a1) discharging the energy storage element when the first relay is tripping from the turn-off status to a turn-on status and eliminating the arc by a reverse voltage thereon once the relay is at the turn-on status.

The present invention may best be understood through the following descriptions with reference to the accompanying drawings, in which:

BRIEF DESCRIPTION OF THE DRAWINGS

FIG. 5(*b*) is a schematic circuit diagram showing the main circuit of FIG. 5(*a*) and currents flowing through the first charging/the first discharging loops thereof respectively;

FIG. 6(*b*) is a schematic circuit diagram showing the main circuit of FIG. 6(*a*) and currents flowing through the first charging/the second charging/the main large current/the second discharging loops thereof respectively.

DETAILED DESCRIPTION OF THE PREFERRED EMBODIMENT

Figure 1:
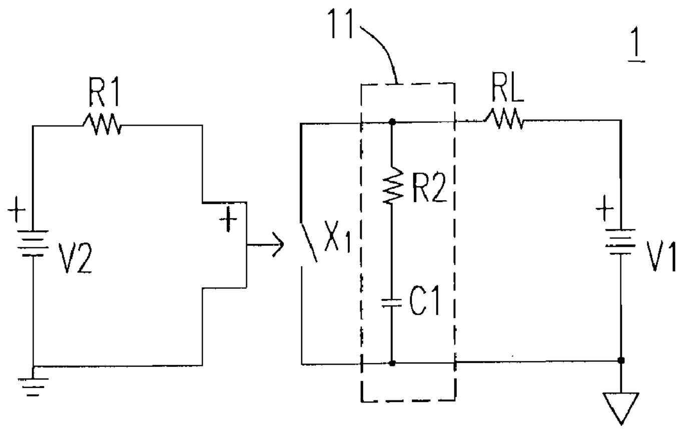
Fig. 1 (PRIOR ART)
FIG. 1 is a circuit diagram of a conventional relay system including a relay protection circuit having an RC circuit.
Figure 2:
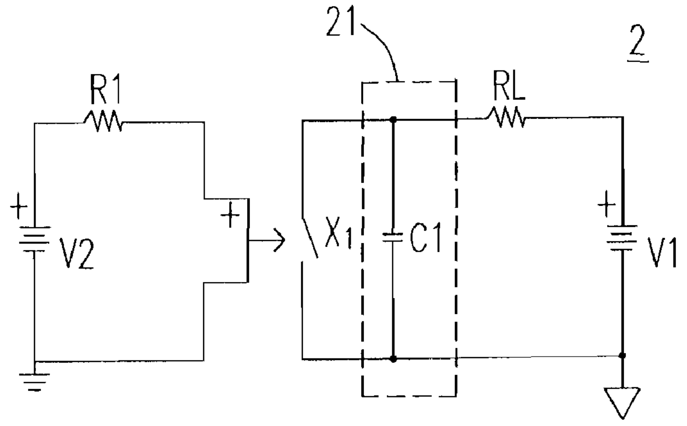
Fig. 2 (PRIOR ART)
FIG. 2 is a circuit diagram of a conventional relay system including a relay protection circuit having a capacitor.
Figure 3:
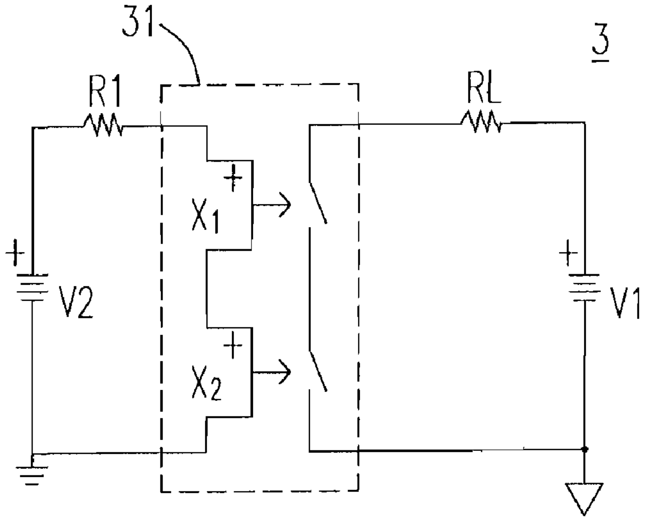
Fig. 3(PRIOR ART)
FIG. 3 is a circuit diagram of a conventional relay system including a relay protection circuit having two relays.
Figure 4:
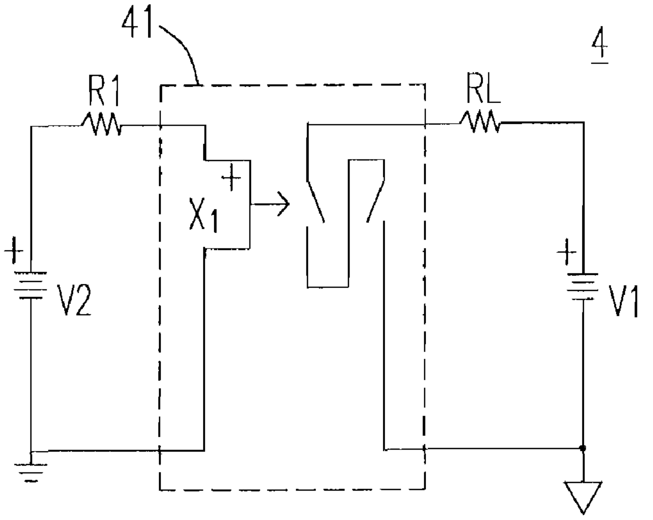
Fig. 4(PRIOR ART)
FIG. 4 is a circuit diagram of a conventional relay system including a relay protection circuit having a double pole single throw relay.
Figure 5A:
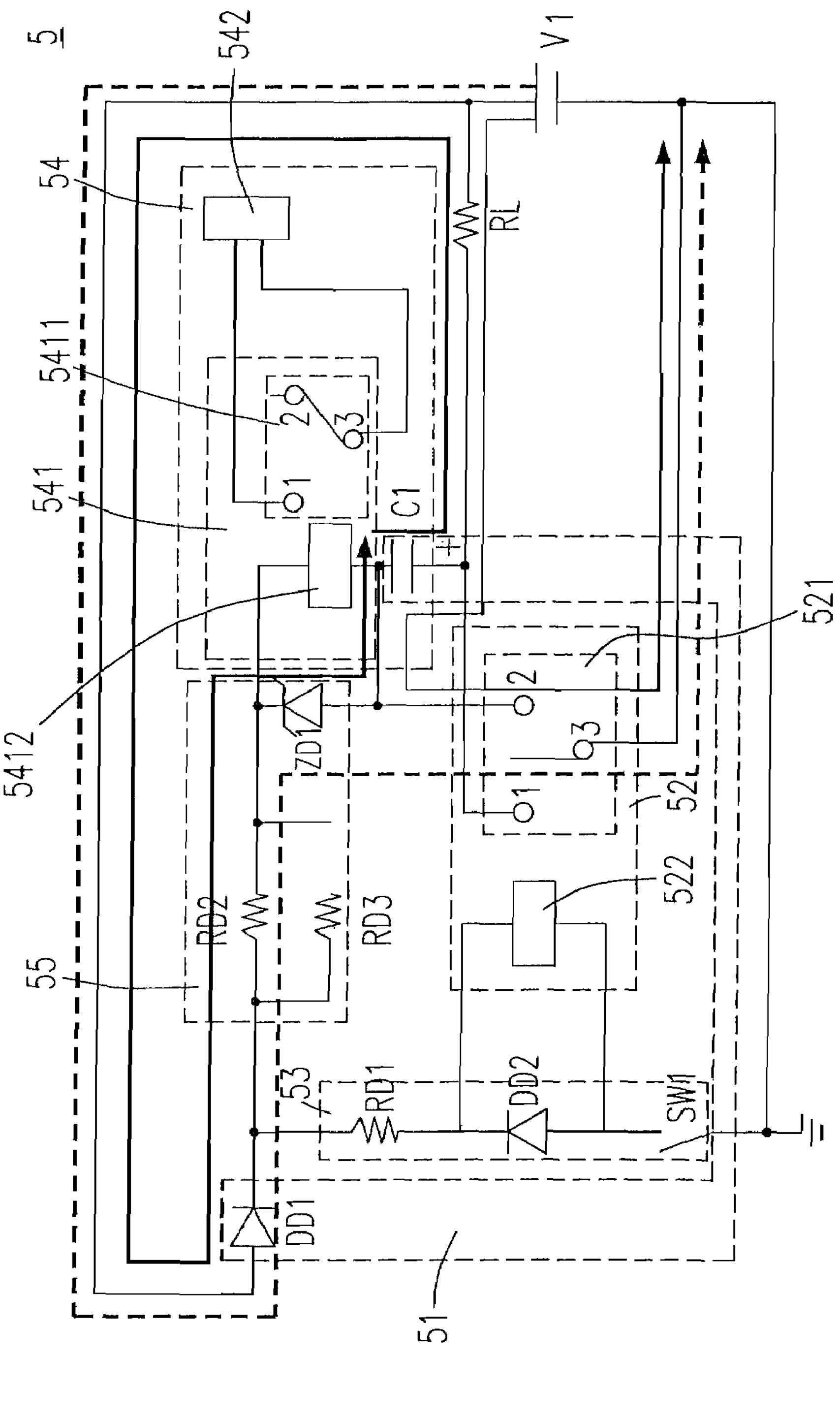
FIG. 5(*a*) is a schematic circuit diagram showing a relay system including a relay protection circuit having an energy storage element and a high-impedance element according to the preferred embodiment of the present invention and currents flowing through the first charging/the first discharging/the second charging loops thereof respectively.
Figure 5B:
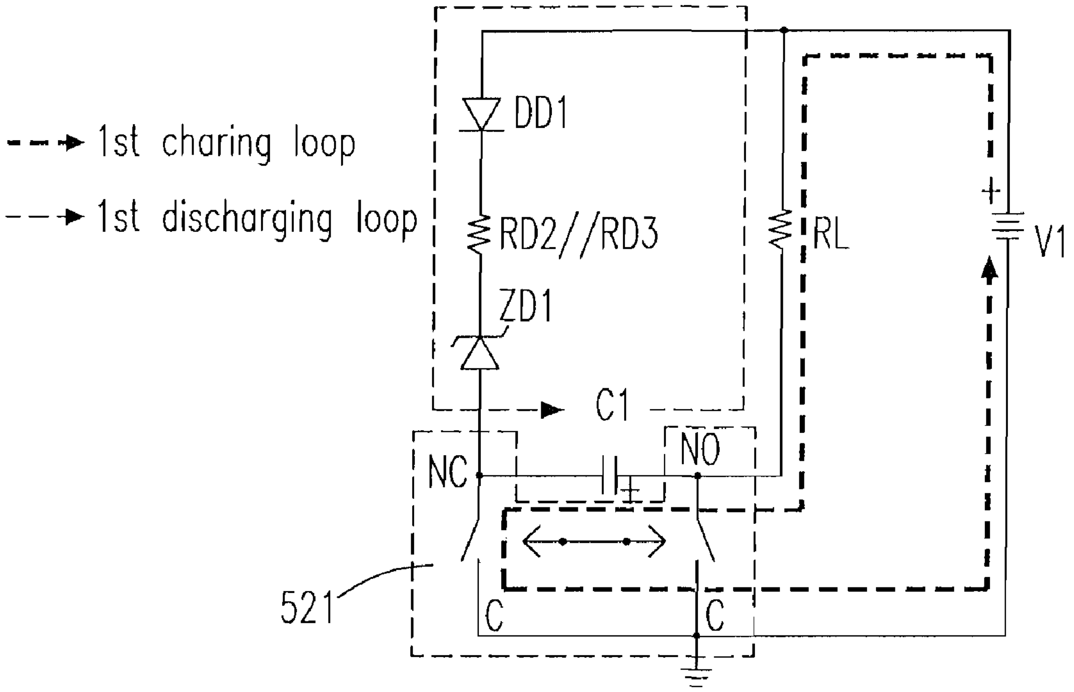

Please refer to FIG. 5(*a*), it is a schematic circuit diagram showing a relay system including a relay protection circuit having an energy storage element and a high-impedance element according to the preferred embodiment of the present invention and currents flowing through the first charging/the first discharging/the second charging loops thereof respectively. In which, the relay system 5 includes a DC power supply V1 having a positive terminal and a negative terminal coupled to a common ground, a load RL having a first terminal and a second terminal coupled to the positive terminal of the DC power supply V1, a relay protection circuit 51 having an energy storage element C1 (a capacitor as shown in FIG. 5(*a*), it could also be a different energy storage element) and a high-impedance element DD1 (a first diode as shown in FIG. 5(*a*), it could also be a resistor having a relatively high resistance), a relay 52, a relay control circuit 53, an alarming system 54 and a voltage divider 55.

The relay protection circuit 51 has an energy storage element C1 for storing and releasing an electrical power and a high-impedance element DD1 to cause the energy storage element C1 to have a relatively speedy charge and a relatively slow discharge so as to eliminate an arc generated by the relay 52. The high-impedance element DD1 is coupled to the second terminal of the load RL, and the energy storage element C1 is coupled to the first terminal of the load RL. The relay 52 includes a trip point 521 and a control coil 522, and the control coil 522 is employed to control a trip of the trip point 521 to form one of a turn-on status and a turn-off status of the relay 52. The trip point 521 further includes a normally open contact (NO), a normally closed contact (NC) and a common contact (C). The turn-on status of the relay 52 is formed when the NO is fully connected to the C, and the turn-off status of the relay 52 is formed when the NC is fully connected to the C. Referring to FIG. 5(*a*), the contact 1 of the trip point 521 is the NO of the relay 52, the contact 2 of the trip point 521 is the NC of the relay 52, the contact 3 of the trip point 521 is the C of the relay 52, the contact 3 is coupled to the common ground, and the contact 1 is coupled to the first terminal of the load RL. Besides, the rely control circuit 53 is employed to control the turn-on status and the turn-off status of the relay 52, the rely control circuit 53 includes a first resistor RD1, a second diode DD2 electrically connected to RD1 in series, and a switch SW1 electrically connected to DD1 in series, the first resistor RD1 is coupled to the cathode of the first diode DD1 (the high-impedance element), the switch SW1 is coupled to the common ground, and the second diode DD2 is coupled to the control coil 522. Furthermore, the alarming system 54 is used to generate an alarm signal when the relay 52 is turned off, and the alarming system 54 having a first and a second terminals includes an alarming relay 541 and an alarming connector 542. The alarming relay 541 includes a trip point 5411 and a control coil 5412 (having a first and a second terminals, which are the first and the second terminals of the alarming system 54, and the trip point 5411 also includes a normally open contact (NO), a normally closed contact (NC) and a common contact (C). In FIG. 5(*a*), the NO of the trip point 5411 is the contact 1, the NC of the trip point 5411 is the contact 2, and the C of the trip point 5411 is the contact 3, and the contacts 2 and 3 of the trip point 5411 form an open circuit. As for the voltage divider 55, it includes a second resistor RD2, a third resistor RD3 electrically connected to the second resistor RD2 in parallel (these two resistors electrically connected to each other in parallel, i.e. RD//RD3, could be replaced by a single resistor having the same resistance), and a zener diode ZD1 electrically connected to the control coil 5412 in parallel and having a cathode electrically connected to the two parallel-connected resistors RD2//RD3 in series and an anode electrically connected to the energy storage element C1 and the contact 2 of the trip point 521.

Please refer to FIG. 5(*a*), both of the alarming system 54 and the voltage divider 55 of the relay system 5 could be omitted. If so, the relay system 5 could still fully accomplish its functions regarding eliminating the arc, but the relay system 5 could not generate the alarm signal when the current flowing through the high-impedance element (the first diode DD1) is at zero current. The cathode of the high-impedance element (the first diode DD1) is coupled to the energy storage element (the capacitor C1) when the alarming system 54 and the voltage divider 55 of the relay system 5 are omitted.

Regarding the controlling method for the relay system 5 having the energy storage element C1 and the high-impedance element DD1 according to the preferred embodiment of the present invention, which would be described in accordance with the operational principles and following the sequence of FIGS. 5(*a*)-5(*b*) and FIGS. 6(*a*)-6(*b*) as follows.

Figure 6A:
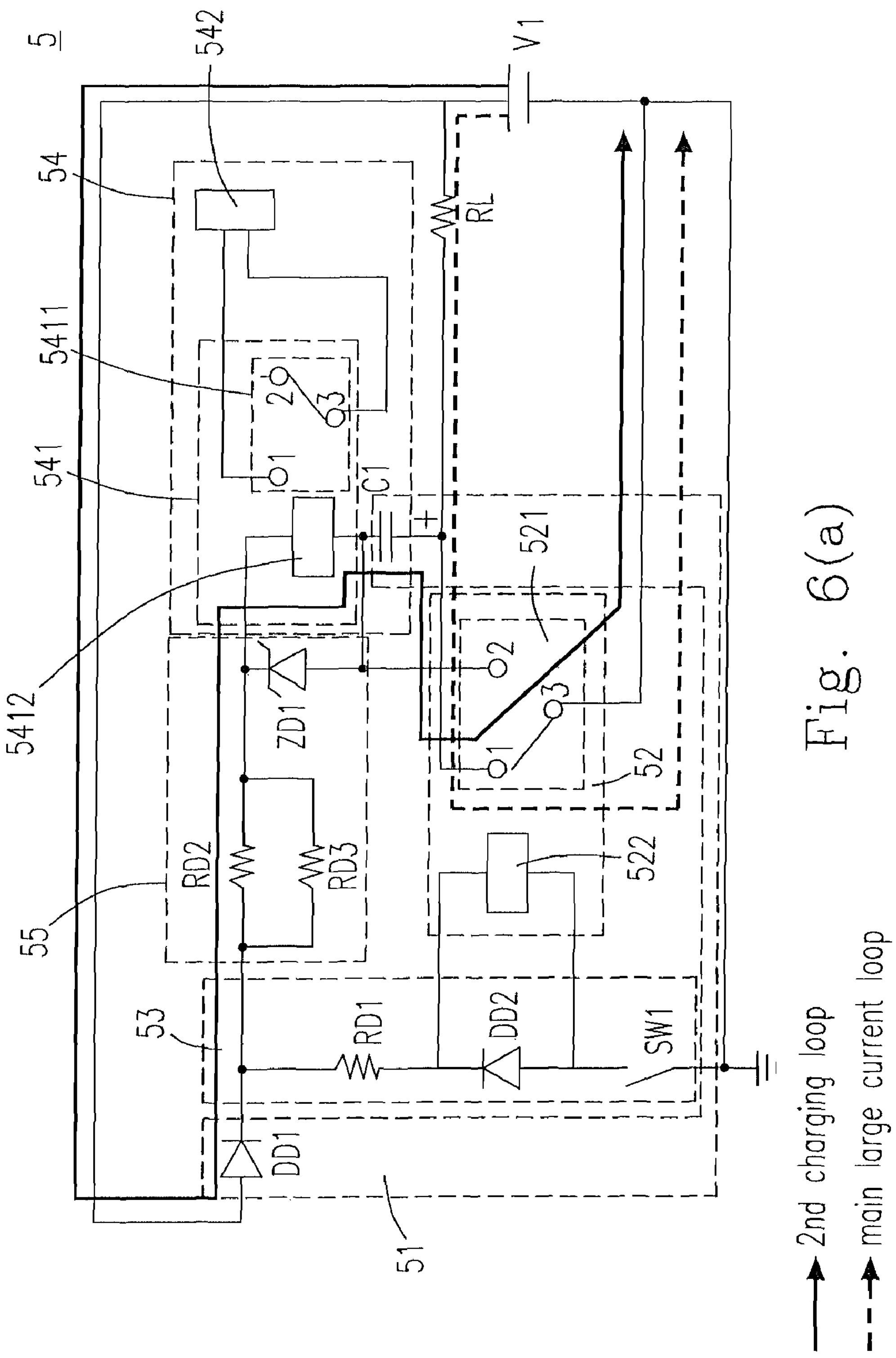
FIG. 6(*a*) is a schematic circuit diagram showing a relay system including a relay protection circuit having an energy storage element and a high-impedance element according to the preferred embodiment of the present invention and currents flowing through the second charging/the main large current loops thereof respectively.
Figure 6B:
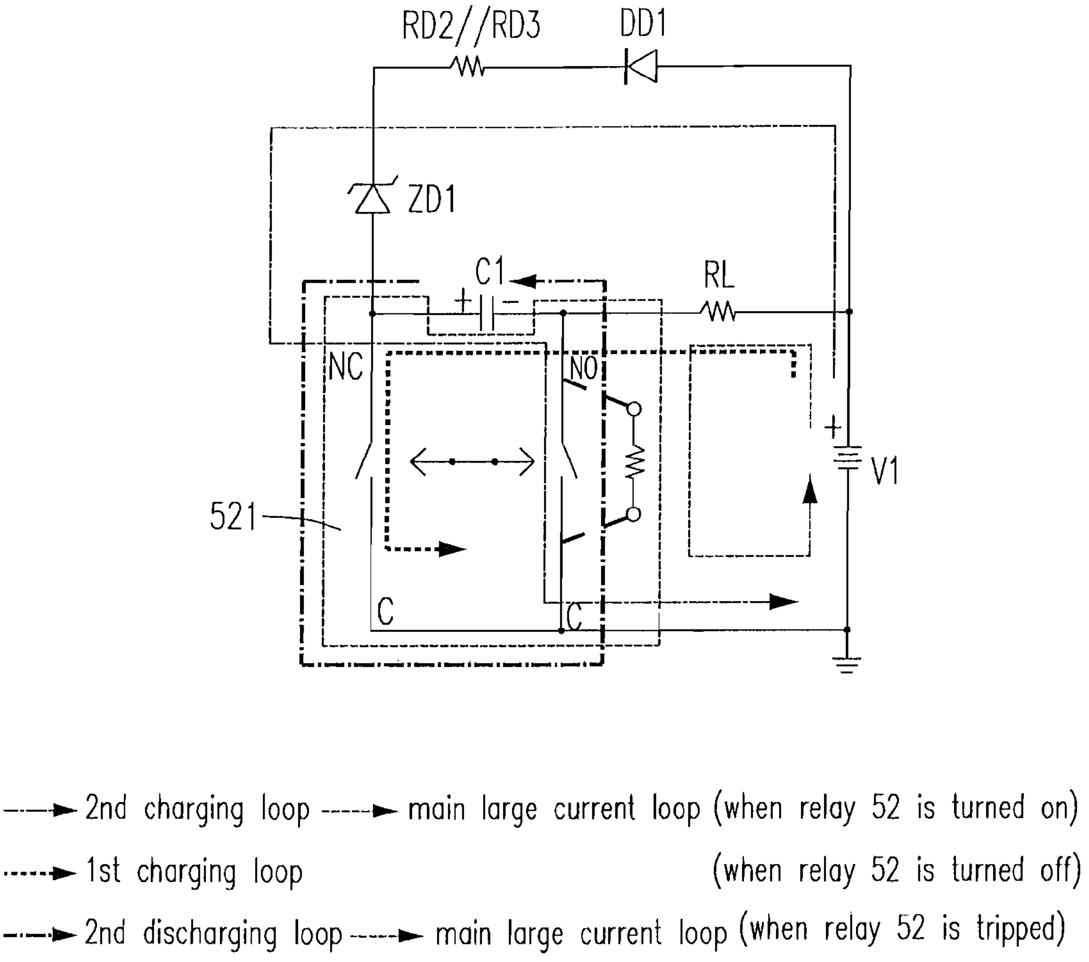

Please refer to FIGS. 5(*a*)-5(*b*) and 6(*a*)-6(*b*), FIG. 5(*b*) shows the main circuit of FIG. 5(*a*) and currents flowing through the first charging and the first discharging loops thereof respectively, FIG. 6(*a*) shows the same schematic circuit diagram as that of FIG. 5(*a*) except that the contacts 1(NO) and 3 (C) of the trip point 521 are fully connected (the turn-on status) and currents flowing through the second charging/the main large current loops thereof are shown respectively, and FIG. 6(*b*) shows the main circuit of FIG. 6(*a*) and currents flowing through the first charging/the second charging/the main large current/the second discharging loops thereof respectively, which are employed to describe the controlling method provided for the relay system 5 having the energy storage element C1 and the high-impedance element DD1 according to the preferred embodiment of the present invention. In which, the relay system 5 includes a load RL at a startup status, a relay protection circuit 51 having the energy storage element C1 coupled to the RL and the high-impedance element DD1 coupled to the energy storage element C1 and a relay 52 electrically connected to the energy storage element C1 in parallel (the relay system 5 further includes a DC power supply V1 and the aforementioned components: the relay control circuit 53, the alarming system 54 and the voltage divider 55 etc.). The above-mentioned controlling method includes the steps of:

(a) charging the energy storage element C1 to a saturation voltage V1 when the relay 52 is at a turn-off status (see FIGS. 5(*a*)-5(*b*), the contacts 2(NC) and 3(C) of the trip point 521 are fully connected to form the turn-off status, the load RL is at a startup status, and a first charging loop is formed by the positive terminal of the power supply V1(+), the load RL, the energy storage element C1, the relay 52 (via the fully connected contacts 2 and 3 of the trip point 521) and the negative terminal of the power supply V1(−) as shown in FIGS. 5(*a*) and 5(*b*) to charge the energy storage element C1);

(b) discharging the energy storage element C1 when the relay 52 is tripping from the turn-off status to a turn-on status and eliminating an arc of the relay 52 by a reverse voltage thereon once the relay 52 is at the turn-on status (see FIGS. 5(*a*)-5(*b*) and 6(*a*)-6(*b*), the relay 52 is tripped from the turn-off status, i.e. the contacts 2(NC) and 3(C) of the trip point 521 are fully connected, to the turn-on status, i.e. the contacts 1(NO) and 3(C) of the trip point 521 are fully connected, the load RL is at a startup status, and a first discharging loop is formed by the positive terminal of the energy storage element C1(+), the load RL, the high-impedance element DD1, the two parallel-connected resistors RD2//RD3, the parallel-connected zener diode and the control coil ZD1/15412, and the negative terminal of the energy storage element C1 (−) as shown in FIGS. 5(*a*) and 5(*b*) to discharge the energy storage element C1 when the relay 52 is tripped from the turned off status to the turn-on status, a second charging loop is formed by the positive terminal of the power supply V1(+), the high-impedance element DD1, the two parallel-connected resistors RD2//RD3, the parallel-connected zener diode and the control coil ZD1//5412, the energy storage element C1, the relay 52 (via the fully connected contacts 1(NO) and 3(C) of the trip point 521) and the negative terminal of the power supply V1(−) as shown in FIG. 5(*a*) to charge the energy storage element C1 when the relay 52 is turned on, the arc of the relay 52 is eliminated by the reverse voltage thereon once the relay 52 is at the turn-on status due to that a voltage polarity of the energy storage element C1 is reversed instantaneously to cause the relay 52 to have the reverse voltage, and a main large current loop is formed by the positive terminal of the power supply V1(+), the load RL, the relay 52 (via the fully connected contacts 1(NO) and 3(C) of the trip point 521) and the negative terminal of the power supply V1(−) as shown in FIGS. 6(*a*) and 6(*b*) and is conductive at this moment);

(c) charging the energy storage element C1 while the relay 52 remains at the turn-on status (see FIGS. 6(*a*)-6(*b*), the load RL is at a startup status, and the aforementioned second charging and main large current loops as shown in FIGS. 6(*a*)-6(*b*) are both conductive when the relay 52 remains at the turn-on status);

(d) forming a second discharging loop and causing the first relay to have the reverse voltage so as to eliminate the arc when the first relay is tripping from turn-on status to the turn-off status (see FIGS. 6(*a*)-6(*b*), the relay 52 is tripped from the turn-on status, i.e. the contacts 1(NO) and 3(C) of the trip point 521 are fully connected, to the turn-off status, i.e. the contacts 2(NC) and 3(C) of the trip point 521 are fully connected, the load RL is at a startup status, the diode DD1 becomes conductive reversely, the energy storage element C1 has no discharging loop such that C1 has enough electrical power to form a reverse electrical power (reverse voltage) between the NO and NC contacts of the trip point 521 of the relay 52 to eliminate the arc of the relay 52 while the relay 52 is tripping from the turn-on status to the turn-off status, and a second discharging loop is formed by the positive terminal of the energy storage element C1(+), the NC, NO and C contacts of the trip point 521 of the relay 52, and the negative terminal of the energy storage element C1 (−) as shown in FIG. 6(*b*) to discharge the energy storage element C1 when the relay 52 is tripping from the turned on status to the turn-off status); and (e) going to step (a) when the relay 52 is at the turn-off status (see FIG. 6(*b*), the above-mentioned first charging loop as shown in FIG. 6(*b*) is conductive when the NC and C contacts of the trip point 521 of the relay 52 are fully connected).

In conclusion, the provided relay system 5 including the protection circuit 51 having the energy storage element C1 and the high-impedance element DD1 has the advantages of having a relatively better effectiveness in suppressing a DC arc, the proposed relay system 5 could operate within the relatively maximum range of the rated current and voltage as specified by the specification, respectively the volume and costs of the relay system 5 are relatively smaller and relatively lower than those of the existing relay systems having relay protection circuits such as one of the two relays being electrically connected to each other in series and the double pole single throw relay to eliminate the arc due to the relatively smaller sizes and the simplicity of the energy storage element and the high-impedance elements, the circuit, which employs the provided relay system 5, is relatively simpler in its configuration due to the simplicity of the structures of the energy storage element and the high-impedance element, the high-impedance element DD1 is coupled to the second terminal of the load RL to cause the energy storage element C1 to have a relatively speedy charge and a relatively slow discharge such that an arc of the relay 52 could be totally eliminated by a reverse voltage thereon, and the present relay system 5 can be applied to one of a big relay having a relatively higher operational voltage and an isolated switch at the output terminal of a power supply such that the unwanted results like the contacts of the relay are melted down due to the voltage across the two terminals of a contact is larger than the rated voltage of relay and the working voltage is lowered to cope with the employment of the relay could all be avoided.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A relay system, comprising:

a load having a first and a second terminals;

a first relay coupled to a common ground and the first terminal of the load;

a relay protection circuit suppressing an arc generated by the first relay, comprising:

an energy storage element coupled to the first relay and the first terminal of the load for storing and releasing an electrical power; and a high-impedance element coupled to the second terminal of the load to cause the energy storage element to have a relatively speedy charge and a relatively slow discharge;

a voltage divider electrically connected between the energy storage element and the high-impedance element in series and providing an output signal when the first relay is tripping; and an alarming system having a first and a second terminals, being one of the configurations that the first terminal of the alarming system is coupled to the second terminal of the energy storage element and the second terminal of the alarming system is coupled to the voltage divider, and the first terminal of the alarming system is coupled to the voltage divider and the second terminal of the alarming system is coupled to the second terminal of the energy storage element.

2. A relay system according to claim 1, wherein the energy storage element has a first terminal coupled to the first terminal of the load and a second terminal, the high-impedance element has a first terminal coupled to the second terminal of the load and a second terminal coupled to the second terminal of the energy storage element, and the first relay further comprises:

a trip point having a normally open, a normally closed and a common contacts, forming a turn-on status of the first relay via connecting the normally open and the common contacts to form a first loop, forming a turn-off status of the first relay via connecting the normally closed and the common contacts to form a second loop, electrically connected to the energy storage element in parallel via the normally open and the normally closed contacts and coupled to the common ground via the common contact; and a control coil controlling a trip of the trip point to form one of the first loop and the second loop.

3. A relay system according to claim 2, further comprising:

a relay control circuit controlling the turn-on and the turn-off statuses of the first relay, comprising:

a first diode having an anode and a cathode, electrically connected to the control coil in parallel and being a bleeder diode for de-energizing the control coil;

a first resistor having a first terminal coupled to the cathode of the first diode and a second terminal coupled to the second terminal of the high-impedance element; and a switch having a first terminal coupled to the anode of the first diode and a second terminal coupled to the common ground;

the voltage divider, comprising:

a second resistor having a first terminal coupled to the second terminal of the high-impedance element and a second terminal;

a third resistor having a first terminal coupled to the first terminal of the second resistor and a second terminal coupled to the second terminal of the second resistor; and a zener diode having an anode coupled to the second terminal of the energy storage element and a cathode coupled to the second terminal of the third resistor; and the alarming system, further comprising:

an alarming connector having a first and a second terminals and generating an alarming signal when the output signal is at zero current; and a second relay having a control coil coupled to the first and the second terminals of the alarm system and electrically connected to the zener diode in parallel, a normally open contact, a normally closed contact and a common contact coupled to the second terminal of the alarming connector and being one of the configurations that the normally open contact is an open circuit and the normally closed contact is coupled to the first terminal of the alarming connector, and the normally closed contact is an open circuit and the normally open contact is coupled to the first terminal of the alarming connector, wherein each of the first and the second relays is a changeover relay, and the high-impedance element is one of a second diode and a fourth resistor, and the fourth resistor has a relatively high resistance.

4. A relay system according to claim 1, wherein the energy storage element is a capacitor.

5. A relay system according to claim 1, further comprising a DC power supply providing a voltage, wherein the DC power supply comprises:

a positive terminal coupled to the second terminal of the load; and a negative terminal coupled to the common ground.

6. A controlling method for a relay system, wherein the relay system comprises a load at a startup status, a relay protection circuit having an energy storage element coupled to the load and a high-impedance element coupled to the energy storage element, a first relay coupled to the energy storage element and an alarm connector as claimed in claim 3, comprising the steps of:

(a) charging the energy storage element to a saturation voltage when the first relay is at a turn-off status;

(b) discharging the energy storage element when the first relay is tripping from the turn-off status to a turn-on status and eliminating an arc of the first relay by a reverse voltage thereon once the first relay is at the turn-on status;

(c) charging the energy storage element while the first relay remains at the turn-on status;

(d) generating an alarming signal by the alarm connector when the output signal is at zero current; and (e) going to step (a) when the first relay is at the turn-off status.

7. A controlling method according to claim 6, wherein the reverse voltage is formed by inputting a voltage across the energy storage element to the relay.

8. A controlling method according to claim 6, wherein the relay system further comprises a DC power supply having a positive terminal coupled to the load and a negative terminal coupled to a common ground, and the step (a) further comprises the step of:

(a1) forming a charging loop by the positive terminal of the power supply, the load, the energy storage element and the first relay and the negative terminal of the power supply when the energy storage element is charged.

9. A controlling method according to claim 6, wherein the step (b) further comprises the steps of:

(b1) discharging the energy storage element via a discharging loop formed by the energy storage element, the load and the high-impedance element;

(b2) reversing a voltage polarity of the energy storage element instantaneously to cause the first relay to have the reverse voltage once the first relay is at the turn-on status; and (b3) forming a main large current loop by the positive terminal of the DC power supply, the load, the first relay and the negative terminal of the DC power supply such that the main large current loop is conductive while the first relay normally remains at the turn-on status.

10. A controlling method according to claim 9, wherein the step (c) further comprises the steps of: (c1) forming a charging loop by the positive terminal of the power supply, the high-impedance element, the energy storage element, the first relay and the negative terminal of the power supply when the energy storage element is charged; and (c2) causing the main large current loop to be conductive simultaneously while the first relay normally remains at the turn-on status.

11. A controlling method according to claim 6, wherein the step (e) further comprises the step of:

(e0) forming a discharging loop and causing the first relay to have the reverse voltage so as to eliminate the arc when the first relay is tripping from the turn-on status to the turn-off status.

12. A controlling method according to claim 11, wherein the step (b) further comprises the steps of:

(b1) discharging the energy storage element via a discharging loop formed by the energy storage element, the load and the high-impedance element;

(b2) reversing a voltage polarity of the energy storage element instantaneously to cause the first relay to have the reverse voltage once the first relay is at the turn-on status; and (b3) forming a main large current loop by the positive terminal of the DC power supply, the load, the first relay and the negative terminal of the DC power supply such that the main large current loop is conductive while the first relay normally remains at the turn-on status; and the step (e0) further comprises the steps of:

(e01) causing the first relay to have the reverse voltage when the voltage across the energy storage element is reversed while the first relay is tripping from the turn-on status to the turn-off status; and (e02) causing the main large current loop to be conductive simultaneously while the first relay is tripping from the turn-on status to the turn-off status.

13. A controlling method according to claim 11, wherein the discharge loop comprises the energy storage element and the first relay.

14. A controlling method according to claim 10, wherein the relay system further comprises a voltage divider electrically connected between the energy storage element and the high-impedance element in series, a charging and a discharging loops are the charging and the discharging loops as claimed in claim 10, and each of the charging and the discharging loops further comprises the voltage divider.

15. A controlling method for a relay system, wherein the relay system comprises a load at a startup status, a relay protection circuit having an energy storage element coupled to the load and a high-impedance element coupled to the energy storage element, a first relay coupled to the energy storage element and an alarm connector as claimed in claim 3, comprising the steps of:

(a) charging the energy storage element to a saturation voltage when the first relay is at a turn-off status;

(b) charging the energy storage element while the first relay remains at the turn-on status;

(c) forming a discharging loop and causing the first relay to have the reverse voltage to eliminate an arc of the first relay when the first relay is tripping from the turn-on status to the turn-off status;

(d) generating an alarming signal by the alarm connector when the output signal is at zero current; and (e) going to step (a) when the first relay is at the turn-off status.

16. A controlling method according to claim 15, wherein the step (a) further comprises the step of:

(a1) discharging the energy storage element when the first relay is tripping from the turn-off status to a turn-on status and eliminating the arc by a reverse voltage thereon once the relay is at the turn-on status.

17. A relay system, comprising:

a load having a first and a second terminals;

a first relay coupled to a common ground and the first terminal of the load;

a relay protection circuit eliminating an arc generated by the first relay, comprising:

a first electronic element coupled to the first relay and the first terminal of the load for storing and releasing an electrical power; and a second electronic element coupled to the second terminal of the load to cause the first electronic element to have a relatively speedy charge and a relatively slow discharge;

a voltage divider electrically connected between the energy storage element and the high-impedance element in series and providing an output signal when the first relay is tripping; and an alarming system having a first and a second terminals, being one of the configurations that the first terminal of the alarming system is coupled to the second terminal of the first electronic element and the second terminal of the alarming system is coupled to the voltage divider, and the first terminal of the alarming system is coupled to the voltage divider and the second terminal of the alarming system is coupled to the second terminal of the second electronic element.

18. A relay system according to claim 17, wherein the first electronic element is an energy storage element.

19. A relay system according to claim 17, wherein the second electronic element is a high-impedance element.

20. A relay system, comprising:

a load having first and a second terminals;

a first relay coupled to a common ground and the first terminal of the load, comprising:

a trip point having a normally open contact, a normally closed contact, and a common contact, forming a turn-on status of the first relay via connecting the normally open and the common contacts to form a first loop, forming a turn-off status of the first relay via connecting the normally closed and the common contacts to form a second loop, and coupled to the common ground via the common contact; and a control coil controlling a trip of the trip point to form one of the first loop and the second loop;

a relay protection circuit suppressing an arc generated by the first relay, comprising:

an energy storage element coupled to the first relay and the first terminal of the load for storing and releasing an electrical power, the energy storage element having a first terminal coupled to the first terminal of the load and a second terminal; and a high-impedance element coupled to the second terminal of the load to cause the energy storage element to have a relatively speedy charge and a relatively slow discharge, the high-impedance element having a first terminal coupled to the second terminal of the load and a second terminal coupled to the second terminal of the energy storage element;

a voltage divider electrically connected between the energy storage element and the high-impedance element in series and providing an output signal when the first relay is tripping;

an alarming system having a first and a second terminal, being one of the configurations that the first terminal of the alarming system is coupled to the second terminal of the energy storage element and the second terminal of the alarming system is coupled to the voltage divider, and the first terminal of the alarming system is coupled to the voltage divider and the second terminal of the alarming system is coupled to the second terminal of the energy storage element;

an alarming connector having a first and a second terminal and generating an alarming signal when the output signal is at zero current; and a second relay having a control coil coupled to the first and the second terminals of the alarm system, a normally open contact, a normally closed contact, and a common contact coupled to the second terminal of the alarming connector, and being one of the configurations that the normally open contact is an open circuit and the normally closed contact is coupled to the first terminal of the alarming connector, and the normally closed contact is an open circuit and the normally open contact is coupled to the first terminal of the alarming connector.

* * * * *